United States Patent [19]

Kofink

[11] 4,039,915
[45] Aug. 2, 1977

[54] D-C COMMUTATOR-TYPE DYNAMO ELECTRIC MACHINE WITH ELECTRONIC CONTROL

[76] Inventor: Wolfgang Kofink, Schanbacher Strasse 8, 7301 Aichwald-Lobenrot, Germany

[21] Appl. No.: 572,869

[22] Filed: Apr. 29, 1975

[30] Foreign Application Priority Data

May 2, 1974    Germany .............................. 2421180

[51] Int. Cl.² ............................................ H02P 7/06
[52] U.S. Cl. .................................... 318/439; 318/254
[58] Field of Search ........................ 318/439, 138, 254

[56] References Cited
U.S. PATENT DOCUMENTS

| | | | |
|---|---|---|---|
| 3,453,513 | 7/1969 | Bates et al. ........................ | 318/439 X |
| 3,631,529 | 12/1971 | Ohyama ............................ | 318/439 X |
| 3,667,011 | 5/1972 | Casaday et al. .................. | 318/439 X |
| 3,840,790 | 10/1974 | Stich et al. ........................ | 318/439 X |
| 3,896,349 | 7/1975 | Lozenko et al. .................. | 318/439 X |

*Primary Examiner*—Gene Z. Rubinson
*Attorney, Agent, or Firm*—Flynn & Frishauf

[57] ABSTRACT

An electronic controlled switch, for example a bipolar thyristor, is included in the armature circuit between the brushes, conduction of the thyristor being controlled by a pulse source providing pulses in synchronism with the rotation of the machine for selectively timed energization of the thyristor and hence connection of the armature winding. The pulse source may be a mechanical interrupter coupled to the machine shaft, a separate pulse source, or the like, and the thyristor can be directly controlled from the pulse source by means of slip rings, or non-contacting pulse transfer circuit elements, such as inductive elements.

10 Claims, 3 Drawing Figures

D-C COMMUTATOR-TYPE DYNAMO ELECTRIC MACHINE WITH ELECTRONIC CONTROL

The present invention relates to a direct current commutator-type dynamo electric machine which is controlled by pulses from a pulse source.

Commutator-type direct current machines have been proposed, controlled by pulses derived from pulse sources. The pulse control is derived usually by d-c choppers, which are electronically controlled devices chopping the direct current in pulses having predetermined pulse periods, or repetition rates. This type of control, and such pulse sources have the disadvantage that, particularly for larger motors, a substantial number of components are required. Chokes, or other inductive elements are also needed which increase the apparatus requirements and may introduce electrical noise.

It is an object of the present invention to control a commutator-type d-c motor by controlling the armature current while avoiding the necessity of high-power choppers for the machine, as well as large choke elements.

SUBJECT MATTER OF THE PRESENT INVENTION

Briefly, the armature current is controlled by circuit elements which are part of the machine itself, connected in the armature current path between the brushes of the machine, that is, directly on the armature. The electronic switching elements are controlled to conduction by mechanical, electrical or electronic pulse sources, coupled thereto, and providing for selective energization thereof.

The invention will be described by way of example with reference to the accompanying drawings, wherein.

Figure 1:
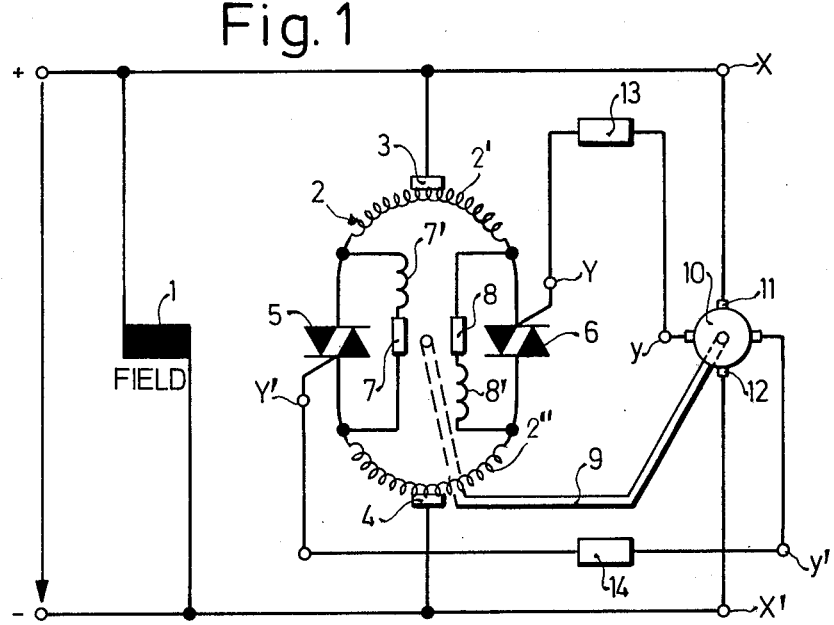
FIG. 1 is a general circuit diagram of a d-c shunt motor and incorporating the subject matter of the present invention.

The shunt field 1 of a dynamo electric machine, which may be operated as a motor or as a generator, is connected across a source of supply marked + and − . The armature winding 2, the circuit of which is shown only schematically in circular form is connected between the brushes 3, 4. Two electronically controlled switches 5, 6 are inserted in the armature winding circuit, offset by 180° electrical and separating winding 2 into portions 2' and 2''. The electronic control elements which are, for example bilateral, or reversely conductive thyristors or triacs have, each, a parallel circuit connected thereto, which includes an inductive winding 7', 8' of high resistance, as schematically illustrated by the separate resistors 7, 8. The resistance of windings 7', 8' is high relative to the resistance of the armature winding itself. The additional windings 7', 8' are so connected and located that the phase of the induced voltage therein compensates the voltage arising upon commutation, or reversal of current. The windings 7', 8' eliminate high inductive voltage peaks which arise upon switching of the electronic control switches 5, 6.

Switches 5, 6 are rendered conductive by pulses applied to the respective gate electrodes.

The pulse source to gate the switches 5, 6, as shown in FIG. 1, is a breaker unit 10 driven from the motor shaft, which is schematically indicated by line 9. The breaker 10 is connected to terminals X, X', deriving its power from the main supply terminals of the dynamo electric machine. Current is supplied to the breaker 10 by brushes 11, 12, connected to terminals X, X', and taken off terminals y, y'. Coupling resistors 13, 14 connect the brush terminals y, y' to the gate terminals Y, Y' of the electronic switches 5, 6.

The reversely conductive thyristors 5, 6 are triggered when current is supplied through the breaker 10; they are extinguished when the associated winding passes through the magnetic field of opposite polarity, and during commutation since, upon commutation, the direction of current flow through the armature winding will reverse. Connecting the compensating windings 7', 8' in parallel to the respective electronic switches, as shown, compensates voltages which arise upon commutation, thereby providing protection to the thyristor switches. The thyristor switches can also be protected against excessive current by utilizing a centrifugal switch which bridges the electrical switches if the speed of the motor is excessively low, or excessively high.

The invention is applicable regardless of the mode of operation of the dynamo electric machine, that is, whether operating as a motor, externally energized, or whether operating in generator mode and supplying power to external lines. The temporal position of the pulses can be suitably selected, in dependence on the mode of operation.

The motor and control system in accordance with the present invention is also applicable to such motors used with resistance starters, in which a resistor is included in the armature circuit to limit the starting armature current. After the motor reaches a certain speed, a centrifugal switch bridges the armature starting resistor.

Figure 2:
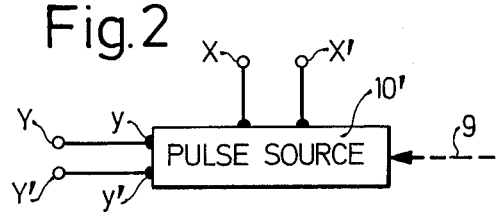
FIG. 2 is a fragmentary circuit diagram illustrating a modification of the basic circuit of FIG. 1.
Figure 3:
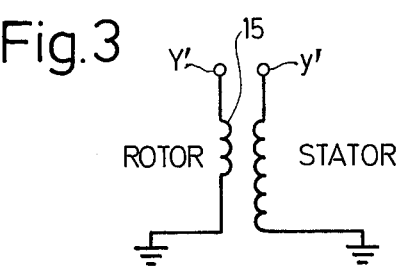
FIG. 3 is a fragmentary diagram illustrating another modification of the circuit of FIG. 1.

The pulse source may be an external pulse source, as illustrated in FIG. 2. Speed information is supplied to pulse source 10', as schematically indicated by the arrow connected to broken line 9 which, noted, represents the output shaft. Power is supplied from terminals X, X'. The output terminals y, y' of the pulse source are connected to the gate terminals Y, Y' of the thyristor switches. These gate terminals can be brought out to slip rings, for connection to pulse source 10' of FIG. 2, or to the breaker 10 of FIG. 1. Rather than using slip rings, non-contacting arrangements can be used. For example, terminal y' of the pulse source 10' of FIG. 2 can be connected to a winding located on the stator of the machine, as schematically illustrated in FIG. 3. A pick-up winding 15 is then located on the rotor and the connection to the gate Y' includes a pick-up coil 15, inductively coupled to the stator coil connected to terminal y'. Upon energization of terminal y' from the pulse source, which may be breaker 10 (FIG. 1) or the pulse source 10' of FIG. 2, a similar pulse will be induced in the pick-up coil thereby firing the bilateral thyristor 5. A similar noncontacting arrangement, or other non-contacting energy transfer elements are connected to gate Y of the thyristor 6.

Selective energization of the thyristors, and hence selective connection of the armature winding (or portions thereof) between the brushes thereby permits control of the d-c dynamo electric machine.

Various changes and modifications may be made within the scope of the inventive concept.

I claim:

1. Direct-current, dynamo electric machine having an armature winding (2);

a commutator/and brushes (3, 4) connecting the terminals of the machine to the commutator;
electrically controlled switch means (5, 6) connected in series circuit with the armature winding (2) and separating the winding (2) into winding portions (2', 2");
and a pulse source (10, 10') synchronized with rotation of the machine, connected to and controlling conduction of the controlled switch means and providing pulses to said switch means to selectively connect together the armature winding portions (2',2") into a complete winding (2).

2. Machine according to claim 1, wherein the controlled switch means (5, 6) are connected in series with the armature winding portions (2', 2") of the armature winding to selectively provide a completely connected armature winding (2) for a period of time determined by the instant of energization of the switch means, as determined by the pulse source (10, 10').

3. Machine according to claim 1, wherein the controlled switch means (5, 6) comprises thyristors which are fired by pulses from the pulse source, and conduction of which is interrupted upon reversal of current flow through the armature winding upon rotation of the armature of the machine.

4. Machine according to claim 3, wherein the thyristors are reversely polarized parallel thyristors, located in the armature windings and offset from each other by 180 electrical degrees.

5. Machine according to claim 1, further comprising additional windings (7, 8) connected to the controlled switch means, said additional windings having a resistance which is high relative to the resistance of the armature windings, in order to suppress high inductive voltage peaks.

6. Machine according to claim 5, wherein the additional high resistance windings (7, 8) are connected in parallel to the electronic controlled switch means.

7. Machine according to claim 1, further comprising additional windings (7', 8') connected in parallel to the electronic switch means and located on the armature with respect to the switch means such that the induced voltage has a phase position which compensates voltages induced upon commutation of armature current.

8. Machine according to claim 1, further comprising contact-less energy transfer means (15; FIG. 3) connected, respectively, to the pulse source (10, 10') and to the control terminal of the controlled switch means to provide for contact-less transfer of control pulses from the pulse source to the controlled switch means.

9. Machine according to claim 1, wherein a source of power is provided; and the pulse source comprises a rotating breaker switch (10) connected to the shaft of the machine, means (11, 12) connecting the breaker switch to the power source and means (y, y'; 13, 14) connecting the breaker switch to the controlled switch means (5, 6).

10. Controlled d-c motor comprising
the dynamo electric machine according to claim 1 wherein the pulse source (10, 10') provides pulses effecting selective energization, and hence conduction of the controlled switch means (5, 6) to thereby control the motor.

* * * * *